Patented July 18, 1950

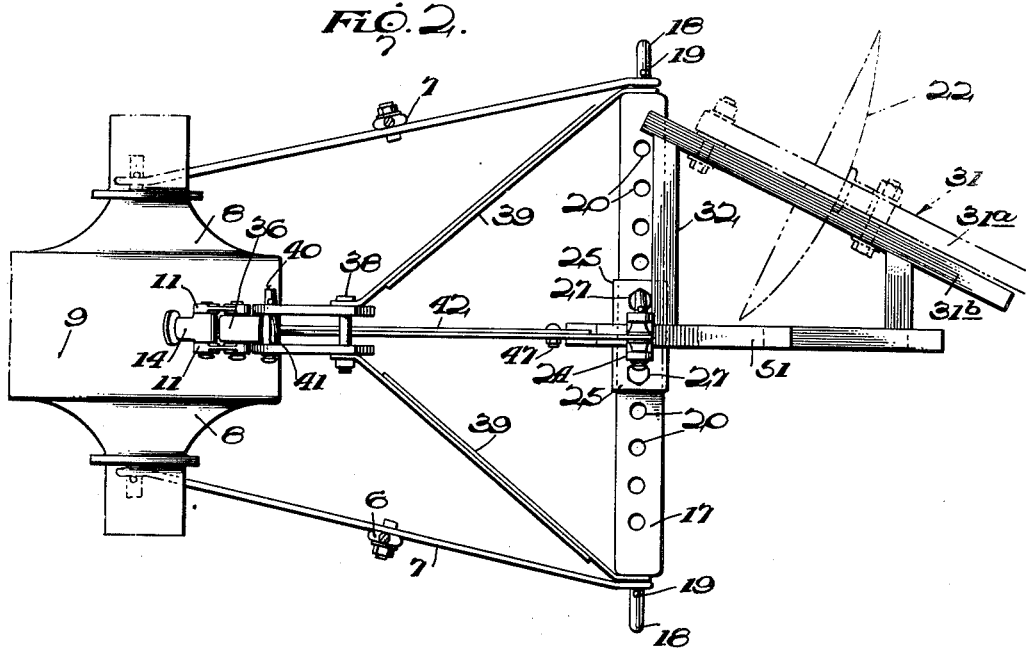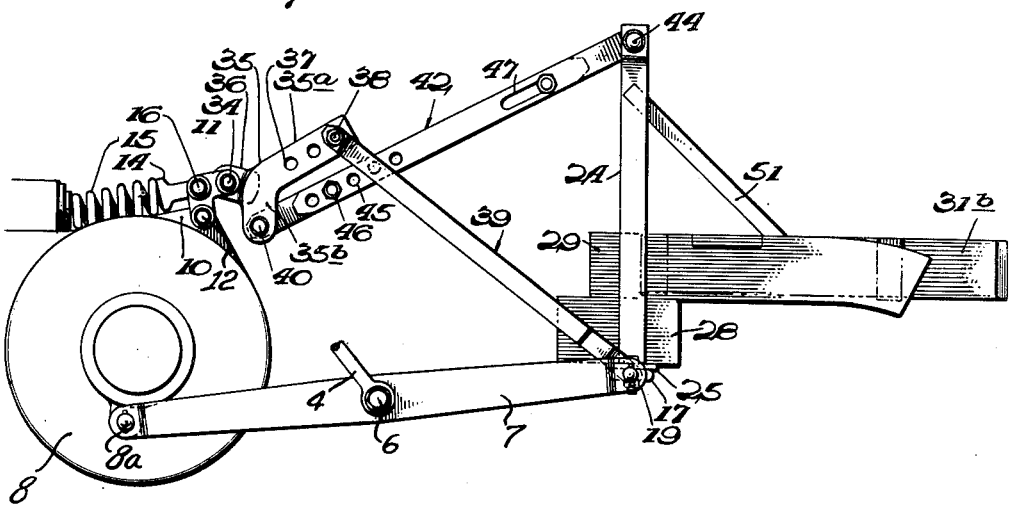
Inventors
Leslie H. Dooley
Hayden H. Parris

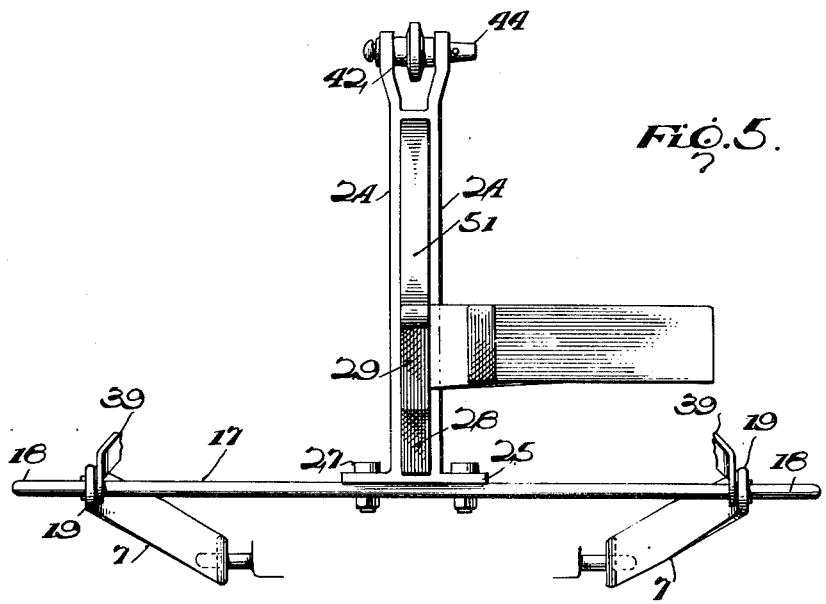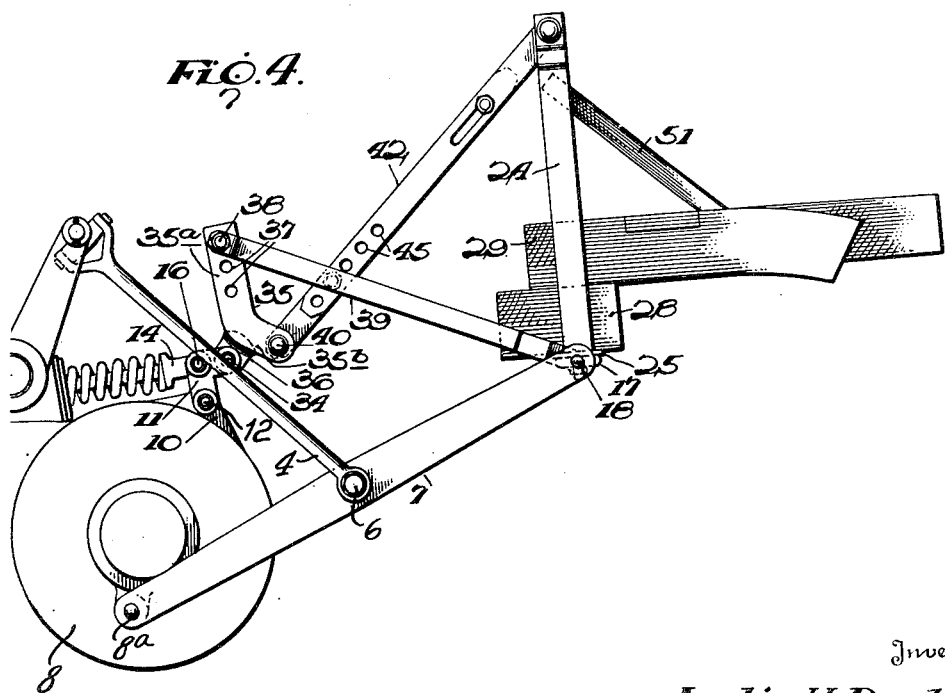

2,515,637

UNITED STATES PATENT OFFICE 2,515,637

TRACTOR AND IMPLEMENT COUPLING FOR SOIL PREPARING MACHINERY

Leslie H. Dooley and Hayden H. Parris, Athens, Tenn.

Application January 22, 1945, Serial No. 573,976

9 Claims. (Cl. 97—47)

Our invention relates in particular to mechanism in agricultural implements for the utilization of the resistance of such implements to movement through the ground when dragged forwardly therethrough, whereby there is exerted a downward pressure upon the implements to cause them to press upon or to enter the soil while being pulled.

In the prior art it has been the practice to cause such implements to press upon or to penetrate the soil by placing weights upon them, or by attaching them to tractors by a downwardly sloping connecting link so as to tend to pull the implement into the ground as it moves forward. An instance of this latter device is that of H. Ferguson, Patent 1,501,652, in which the implement is linked to the tractor by rods having their connection with the tractor at a point lower than their connection with the implement so that there is a tendency to pull the implement into the ground. (The principal feature of Ferguson's device is a variable means of countering this downward tendency so as to prevent the implement from penetrating the soil too deeply on account of unevenness of the ground.)

The use of weights is cumbersome, while the use of a sloping connecting link is not effective to exert a sufficient downward pressure upon many soil preparing implements, particularly where the implements are very light or do not have forwardly sloping points to cause them to enter and to remain in the soil, such as disks and soil or road rollers. The sloping connection merely exerts a tendency upon the implement to enter and remain in the soil. It relies upon the weight of the implement and the shape of the cultivating point of the implement to utilize this tendency. Many cultivating implements are light, and do not have points that pull them into the soil as they move forward.

It is one of the objects of our invention to utilize the resistance of the implements to being dragged upon, or in the soil automatically to exert pressure upon such instruments to force them against or into the soil.

A further object of our invention is to dispense with the necessity of weights upon soil preparing implements in order to force them into the soil.

A further object of our invention is to dispense with the necessity of connecting soil preparing implements to a tractor or other motivating force in such a manner that there will be a downwardly sloping connection tending to cause them to press upon or to penetrate the soil.

A further object of our invention is to provide a more efficient means of exerting a downward force upon soil preparing implements, so as to cause them to press upon or to enter the soil, than either the use of weights or the use of a sloping connection.

A further object of our invention is to provide an adjustable means of exerting a downward pressure upon cultivating implements, whereby to adjust the amount of force exerted upon them to cause them to press upon or to penetrate the soil.

Other objects and advantages of our invention will appear from the following description and accompanying drawings and the novel features thereof will be pointed out in the annexed claims.

In the accompanying drawings,

Figure 2 is a top plan view of a portion of the rear end of a tractor, and showing our device supported thereon;

Figure 3 is a side elevation of the construction shown in Figure 2, and illustrating the device carrying the earth working implements, in lowered position;

Figure 4 is a view similar to Figure 3, but showing the device in elevated position, wherein the earth working implements are raised with relation to the ground surface, and Figure 5 is a rear elevation of a portion of the device viewed from the rear.

Figure 1:
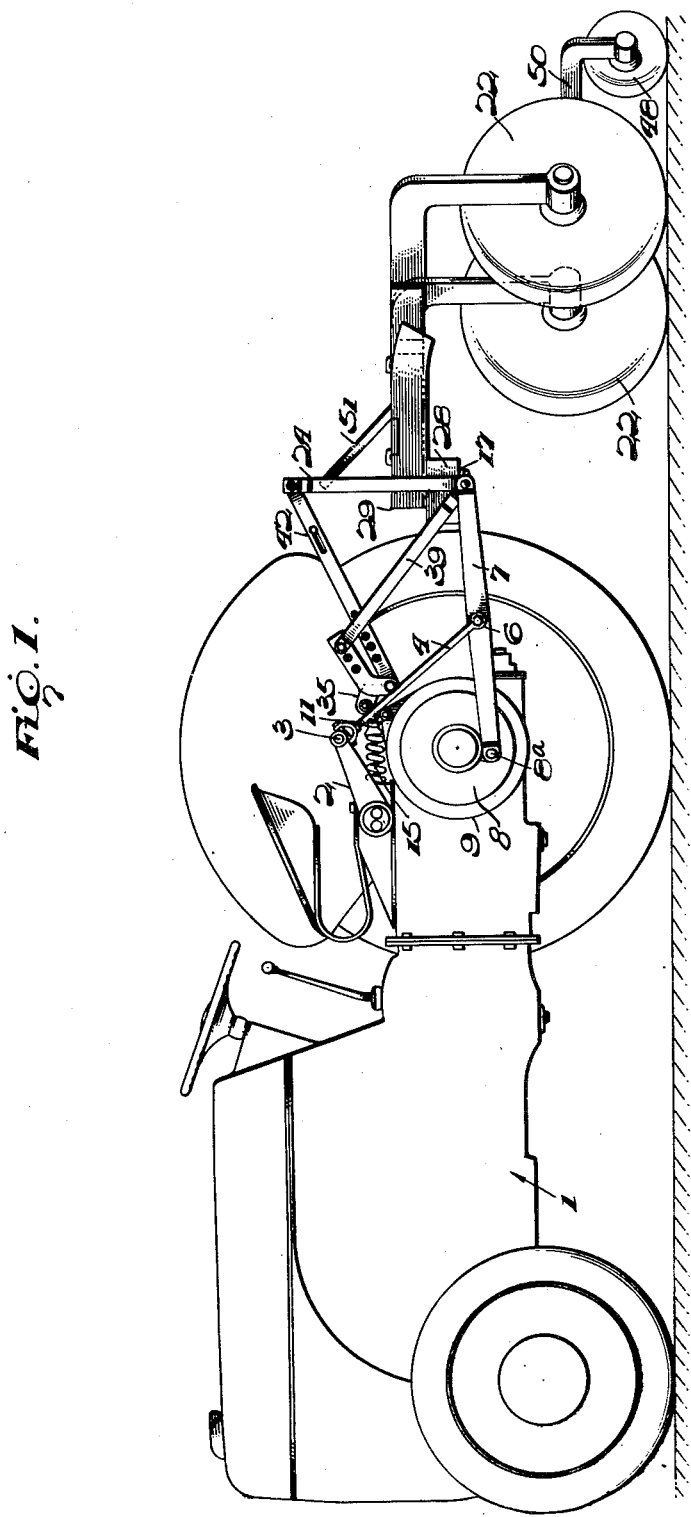
Figure 1 is a side elevation of a tractor, illustrating the manner in which our device is attached thereto.

Referring now more specifically to the drawings by numerals of reference, 1 represents a conventional tractor, provided with the usual hydraulically controlled implement lifting and lowering levers 2, the outer end of each of which is suitably connected, usually by a universal joint 3 with the upper end of a link 4, each of the latter in turn, at their lower end being suitably connected, as by a bolt 6 with an intermediate portion of a draw bar 7, each pivotally connected at its forward end with one of the side plates 8 of the differential housing 9, at 8a. At their rear ends, these draw bars 7 are connected with the implement supporting structure, as will be later described.

The differential housing near its upper portion, is provided with a block 10, to which are journaled a pair of angular levers 11 spaced, one upon each side of said block 10, and pivotally supported through the medium of a pin 12. These spaced angle levers 11 support between them one end of a bar 14, forming a part of a conventional and well known combined tension, compression and hydraulic control spring arrangement 15, the bar 14 being pivotally connected as at 16 between said spaced levers 11.

Supported partially at the rear ends of the draw bars 7 is a transverse bar 17, the ends of which are provided with journal extensions 18, to which, on each end of said transverse bar 17, the ends of the draw bars 7 are respectively pivoted, the bars 7 being secured against displacement by removable pins 19. We, therefore, have the draw bars 7 pivotally connected at their forward ends with the differential housing and pivoted at their rear ends with the implement carrying structure, and bars functioning also as struts or radius rods.

The transverse bar 17 is provided along its length with a series of holes 20, whereby the implement or implements, designated now as 22, may be adjusted laterally of the device, this lateral adjustment in general being, of course, common in earth working implements, and for purposes well known.

Supported upon the transverse bar 17, in the desired position laterally of the machine, is a pair of vertical standards 24, the lower ends of which are provided with a base 25, secured to said transverse bar through the medium of bolts 27 which pass through holes in the base and the selected holes 20 in the bar, the arrangement being shown particularly in Figure 5. Intermediate the spaced vertical standards 24 is a filler block 28, and resting thereon, also between the spaced standards, is the tongue 29, forming one side of a triangular implement supporting structure. It is understood that the block 28 and tongue 29 are securely clamped between the spaced standards 24 in any suitable manner.

The implement supporting structure also includes an angularly arranged bar 31, which of itself directly mounts the earth working implements, in this instance a disk plow or plows. The third member of the triangular structure comprises a bar 32, extending substantially parallel with the transverse bar 17, and connected at its ends, respectively, with the tongue 29 and the angular bar 31. As thus described, the construction embodying elements 17, 24, 29 and 31 and 32 forms a rigid or substantially unitary arrangement, movable as a unit on the axis of the journal extensions 18, during the up-and-down movements of the earth working implements.

Referring now more particularly to Figures 3 and 4 of the drawings, there is pivotally mounted as by pin 34, on the angle levers 11, a pair of spaced bell crank levers 35, these being integrally or rigidly joined to a short arm 36, one lever lying on each side of said arm as shown, and they therefore operate as a unit. Each of these bell crank levers 35 includes a long arm 35a and a relatively shorter arm 35b, each of the longer arms having a series of openings 37 in any one of which may be connected, as by the pivot pin 38, the upper end of a link 39, the lower extremity of the latter being in turn journaled on an extension 18 of the transverse bar 17.

Journaled in openings in the end of the shorter arms 35b, of the bell crank levers, is the pin 40, which is carried by the head 41 of a longitudinally adjustable link 42, said link at its upper or rear end being journaled, as by a pin 44, between the upper ends of the spaced standards 24. The link 42 is formed of two bars clamped in longitudinally adjustable overlapping relation through the medium of the registering openings 45 in each bar, secured together by a bolt 46, and a pin and slot arrangement 47. Through the adjustability between the link 39 and the longer arm 35a, the entire structure which supports the earth working implement or implements may be, first, vertically adjusted, and secondly, the leverage of the bell crank lever may be altered to suit conditions incident to operation of the machine.

The earth working implement, which in the present instance is a disk plow of the conventional character, is mounted on the angularly arranged bar 31, having its particular support clamped by the bars 31a and 31b of the bar 31, and through which the implement may be itself vertically or angularly adjusted to meet the requirements and conditions peculiar to the nature of the earth being operated upon and the desires of the operator. A furrow wheel 49, suitably mounted upon a supporting arm 50 at the rear of the implement supporting structure, serves the function of keeping the plow cutting an even width of land, and also partially controlling the depth of cut which the implement may make. A brace bar 51 connected at its ends, respectively with the tongue 29 and with the vertical standard 24, serves to further render the structure more rigid.

The operation of the construction may be briefly set forth as follows:

Assuming, of course, that the tractor is moving forwardly, and the earth working implements, in this instance disk plows, are within the ground. Upon the implement or implements (assuming a gang of the latter were employed), encountering a type of earth which would tend to cause the implements to stick or be retarded, and which would therefore tend to cause the said implements to ride upwardly and leave the earth, said retardation, dragging or upward movement of the implements will result in a generally pivotal movement of the entire rear structure on the axis of the journals 18. The pivotal point 18, being fixed, in so far as longitudinal movement thereof is concerned, with relation to the body of the tractor, because of the rigid draw bars 7, whose pivotal point is fixed on the differential housing at 8a, the entire rear structure, including the tongue, and with it, of course, the implements, will tilt, pivot, or swing upwardly and forwardly on the axis 18. This movement, through the rigid link 42, will be transmitted to the short arms of bell crank lever 35, which, rocking on pivot 34, will transmit longitudinal and downward movement to the two links 39, resulting in a generally downward thrust to the entire rear structure, causing the earth working implements to penetrate or dig into the ground. In general, the entire rear vertically movable structure swings on two pivots, 40 and 8a, the spring arrangement serving to absorb shock incident to movements of the apparatus and at the same time acting to partially counterbalance the structure.

It should be pointed out that a variable leverage of the bell crank lever 35 with respect to the links to which its ends are pivotally connected, and the remainder of the structure which it operates, may be obtained through the particular arrangement of the series of holes 37 and pin 38, this being, of course, obvious. It also naturally follows that the shorter the effective length of the upper or longer arm of the bell crank lever, the greater the force will be exerted downwardly on the implement to force it into the ground, the degree of the force exerted being of course dependent upon the type of soil being worked. The arrangement disclosed permits of a nicety of adjustment, which we have found desirable and efficient in the operation of our machine.

And now having fully described our invention, we claim:

1. In soil preparing machinery a means of locomotion, an implement for preparing the soil, a vertically swingable pivotal connecting means connecting said means of locomotion and said implement and permitting the forward swinging movement of the upper part of said implement responsive to the forward movement of said means of locomotion, a two armed pivotal element upon said means of locomotion, rigid connecting means between the upper part of said implement and one arm of said pivotal element, for transmitting the force of the swinging movement of said implement to said pivotal element, rigid connecting means between the other arm of said pivotal element and said implement, for transmitting the force of the movement of said pivotal element to said implement in a downwardly direction, whereby said implement is urged downwardly responsive to the forward movement of said means of locomotion.

2. In a soil preparing machine the combination of a tractor for pulling the machine, a two-armed lever pivoted on the tractor, an implement for preparing the soil, vertically movable draft means between said tractor and implement, upon which a part of said implement pivots forwardly when pulled by said tractor, a standard rigidly affixed to said implement, that tilts forwardly when said implement pivots forwardly, a rigid link attached to the upper part of said standard and to the lower arm of said lever, a rigid link having its upper end attached to the upper arm of said lever and its lower end attached to said implement; whereby the forward pivotal movement of the upper part of said implement upon being pulled by said tractor transmits force forward through said standard and first-mentioned link to the lower arm of said lever, and through said lever and said last-mentioned link rearwardly and downwardly upon said implement.

3. In soil preparing machinery, a tractor provided with a pair of laterally spaced draw bars having corresponding ends thereof pivoted to the tractor, a transverse bar to the opposite ends of which the opposite ends of said draw bars are pivotally connected, a soil preparing implement supported by said bar for capacity for rise and fall movement, about the pivotal connection between the draw bars and transverse bar, a bell crank lever pivotally supported by the tractor, a link pivotally interconnecting one arm of the bell crank lever and the implement, and a pair of links pivotally interconnecting the other arm of the bell crank lever and said transverse bar, whereby a rise of the implement forces the transverse bar and draw bars downwardly.

4. In soil preparing machinery according to claim 3, wherein said first link is longitudinally adjustable.

5. In soil preparing machinery according to claim 3, wherein the pivotal connections of the pair of links with said arm of the bell crank lever are adjustable lengthwise of the arm.

6. In soil preparing machinery according to claim 3 wherein the pivotal support of the bell crank lever comprises a pair of angular levers pivoted at corresponding ends to the tractor and pivoted at their opposite ends to the bell crank lever, and said angular levers being pivoted at their vertices to a bar backed by a compression spring.

7. In soil preparing machinery, a tractor having a differential housing, a pair of draw bars having corresponding ends pivotally connected to the housing, a flat transverse bar having cylindrical journals at opposite ends and to which the opposite ends of said draw bars are pivotally connected, a pair of laterally spaced vertical standards supported by the transverse bar intermediate the ends thereof, a soil preparing implement having a tongue supported between the standards, for rise and fall of the implement about the pivotal connections between the draw bars and transverse bar, a bell crank lever pivotally supported by the differential housing, and links pivotally connected with the upper ends of said standards and said journals and with the opposed arms of said bell crank lever whereby rise of the implement effects downward movement of the transverse bars and draw bars.

8. In soil preparing machinery according to claim 7 wherein a bar extends parallel with said transverse bar and is connected with said tongue, and an angular disposed bar connected with said first bar on which the soil working implements are mounted.

9. In soil preparing machinery, a tractor, a soil preparing implement provided with a tongue having a vertically movable pivotal connection with the tractor, a two-arm lever pivotally connected intermediate its ends to the tractor and links pivotally connecting opposite arms of the lever with the tongue and vertically movable pivotal connection whereby upon forward pivotal movement of the tongue the vertically movable pivotal connection will be lowered for maintenance of constant depth of soil penetration by the implement.

LESLIE H. DOOLEY.
HAYDEN H. PARRIS.

REFERENCES CITED

The following references are of record in the file of this patent:

UNITED STATES PATENTS

| Number | Name | Date |
|---|---|---|
| 1,501,652 | Ferguson | July 15, 1924 |
| 1,687,719 | Ferguson | Oct. 19, 1928 |
| 2,118,180 | Ferguson | May 24, 1938 |
| 2,356,231 | Ferguson | Aug. 22, 1944 |
| 2,392,903 | Currie | Jan. 15, 1946 |
| 2,413,807 | Warne | Jan. 7, 1947 |